(12) United States Patent
Dannoux et al.

(10) Patent No.: US 10,018,765 B2
(45) Date of Patent: Jul. 10, 2018

(54) EDGE LIGHTED BACKLIGHT UNIT FOR LIQUID CRYSTAL DISPLAY DEVICE

(71) Applicant: Corning Incorporated, Corning, NY (US)

(72) Inventors: Thierry Luc Alain Dannoux, Avon (FR); Jacques Gollier, Redmond, WA (US); Shenping Li, Painted Post, NY (US); Ying Zhang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/310,274

(22) PCT Filed: May 13, 2015

(86) PCT No.: PCT/US2015/030542
§ 371 (c)(1),
(2) Date: Nov. 10, 2016

(87) PCT Pub. No.: WO2015/175648
PCT Pub. Date: Nov. 19, 2015

(65) Prior Publication Data
US 2017/0261675 A1 Sep. 14, 2017

Related U.S. Application Data

(60) Provisional application No. 61/994,369, filed on May 16, 2014, provisional application No. 62/151,508, filed on Apr. 23, 2015.

(51) Int. Cl.
F21V 7/04 (2006.01)
F21V 8/00 (2006.01)

(52) U.S. Cl.
CPC ......... *G02B 6/0028* (2013.01); *G02B 6/0065* (2013.01)

(58) Field of Classification Search
CPC ..................... G02B 6/0028; G02B 6/0065
See application file for complete search history.

(56) References Cited

U.S. PATENT DOCUMENTS

| 6,508,564 | B1 * | 1/2003 | Kuwabara | G02B 6/0068 362/559 |
| 7,001,058 | B2 * | 2/2006 | Inditsky | G02B 6/0021 362/311.02 |
| 7,287,892 | B1 * | 10/2007 | Pang | G02B 6/0021 362/560 |
| 7,889,290 | B2 | 2/2011 | Mills | |

(Continued)

OTHER PUBLICATIONS

European Patent Office; International Search Report and Written Opinion for International Patent Application No. PCT/US2015/030542, filed on May 13, 2015; dated Aug. 5, 2015; pp. 1-10.

(Continued)

*Primary Examiner* — Donald Raleigh
(74) *Attorney, Agent, or Firm* — Kevin M. Able

(57) ABSTRACT

A light guide plate suitable for use in a liquid crystal display device, the light guide plate comprising a glass plate and a light coupler bonded to a major surface of the light guide plate. Also disclosed is a backlight unit for a liquid crystal display device employing the light guide plate, and a display device employing the backlight unit.

24 Claims, 14 Drawing Sheets

(56) References Cited

U.S. PATENT DOCUMENTS

| | | |
|---|---|---|
| 8,331,746 B2 | 12/2012 | Bogner et al. |
| 2003/0160911 A1* | 8/2003 | Kano .................... G02B 6/0028 349/65 |
| 2004/0130912 A1* | 7/2004 | Miyashita .............. G02B 6/002 362/561 |
| 2007/0081360 A1* | 4/2007 | Bailey .................. G02B 6/0021 362/621 |
| 2007/0279931 A1* | 12/2007 | Bryan .................. G02B 6/0028 362/600 |
| 2009/0059127 A1 | 3/2009 | Nakamoto et al. |
| 2011/0228559 A1* | 9/2011 | Kinder ................. G02B 6/0028 362/608 |
| 2013/0155723 A1* | 6/2013 | Coleman .............. G02B 6/0018 362/621 |
| 2014/0126238 A1 | 5/2014 | Kao et al. |
| 2014/0286048 A1* | 9/2014 | Riello ..................... G09F 13/18 362/608 |
| 2015/0009686 A1* | 1/2015 | Pumyea ................. G02B 6/003 362/341 |
| 2015/0029754 A1* | 1/2015 | Ouderkirk ............ G02B 6/0028 362/628 |
| 2015/0070932 A1* | 3/2015 | Kim ..................... G02B 6/0028 362/610 |
| 2015/0198757 A1 | 7/2015 | Comstock, II et al. |
| 2015/0234112 A1* | 8/2015 | Wang .................... G02B 6/0021 362/606 |
| 2015/0253491 A1 | 9/2015 | Laycock et al. |
| 2016/0139328 A1* | 5/2016 | Hikmet ................ G02B 6/0035 362/84 |
| 2016/0313492 A1* | 10/2016 | Ma ....................... G02B 6/0025 |

OTHER PUBLICATIONS

Gourlay et al.; "74.2: High Efficiency Hybrid LED Backlight for Large-area LCD TV"; Digest of Technical Papers—SID International Symposium, v 41 1, p. 1097-1099, May 2010.

\* cited by examiner

EDGE LIGHTED BACKLIGHT UNIT FOR LIQUID CRYSTAL DISPLAY DEVICE

This application claims the benefit of priority under 35 U.S.C. § 371 of International Patent Application Serial No. PCT/US15/30542, filed on May 13, 2015, which claims the benefit of priority under 35 U.S.C. § 119(e) of U.S. Provisional Application Ser. No. 61/994,369, filed on May 16, 2014 and U.S. Provisional Application Ser. No. 62/151,508, filed on Apr. 23, 2015, the contents of which are relied upon and incorporated herein by reference in their entireties.

BACKGROUND

Field

The present disclosure is directed to an edge lighted backlight unit for a liquid crystal display device, and more particularly a backlight unit comprising a light coupler configured to couple light between a light source and a light guide plate comprising the backlight unit.

Technical Background

Liquid crystal display (LCD) panels typically comprise two pieces of thin glass (color filter substrate and TFT substrate) including a liquid crystal material disposed therebetween, a polymer light guide (e.g. Poly(methyl methacrylate)—PMMA) and a few thin plastic films (diffusers, DBEF films, etc.). Due to the poor elastic modulus of PMMA, the overall structure may have insufficient rigidity to withstand significant physical shock, particularly for large display panels. Young's modulus for PMMA is about 2 gigaPascal (GPa). In contrast, most silica-based glasses have a young's modulus of about 72 GPa. Consequently, additional mechanical structure may be needed to provide stiffness.

Humidity testing shows that PMMA is sensitive to moisture, and dimensions can change by up to about 0.5%. For a polymer light guide with a length of about a meter, this means about 5 millimeters of dimension increase, which is significant and thus makes mechanical design of a backlight unit challenging. Typically, an air gap is provided between the light source (e.g. light emitting diodes—LEDs) and the PMMA light guide to accommodate expansion of the PMMA. Unfortunately, light coupling between the light source and the PMMA light guide is sensitive to the distance between the light source and the light guide, which can cause the display brightness to change as a function of humidity.

PMMA has a coefficient of thermal expansion (CTE) of approximately $75 \times 10^{-6}/°$ C. and has a relatively low thermal conductivity of about 0.2 W/m/K, while the same attributes for a silica-based glass may be $8 \times 10^{-6}/°$ C. and 0.8 W/m/K. PMMA also has a plastic transition temperature of about 105° C. The low thermal conductivity of PMMA impedes heat dissipation from the material. Thus, as the light guide approaches close to the light source, which can dissipate a lot of energy, the PMMA can become very hot.

Due to the poor thermal, mechanical and dimensional stability of PMMA, a glass, such as a silica-based glass, is considered a potential replacement solution for PMMA in liquid crystal display (LCD) backlight units. However, since high quality optical-grade glass can be more expensive to produce than PMMA, the cost of the glass drives technology development toward thinner light guides, while the size of the LED's that must couple to the light guide, for example at least 2 millimeters thick in some cases, require the glass to be thicker than traditional 0.07 millimeter (mm) thick LCD glass to enable close to 100% coupling of light from the LEDs into the light guide.

SUMMARY

In one aspect, a backlight unit is disclosed comprising a glass plate comprising a first major surface, a second major surface and a thickness Th1 therebetween, and a light coupler coupled to the glass plate comprising at least one taper portion extending over and bonded to at least one of the first major surface or the second major surface along an edge portion of the glass plate. A light source, for example one or more LEDs, may be positioned adjacent an input facet of the light coupler.

The light coupler may further include a base portion adjacent an edge surface of the glass plate.

The thickness of the glass plate, Th1, divided by a width, Th2, of the input facet can be in a range from about 0.5 to 1.0.

In some embodiments the light coupler may include a pair of taper portions bonded to the first and second major surfaces of the glass plate, respectively. The light coupler may further comprise a base portion extending between the pair of taper portions, and further include a channel sized to receive the glass plate, wherein the glass plate is positioned within the channel. The channel includes a bottom surface, and a length $L_t$ of the light coupler is equal to the sum of a distance L1 between the input facet and the bottom surface of the channel and a depth L2 of the channel. Accordingly, in some embodiments a ratio $L2/L_t$ may be in a range from about 0.1 to about 0.9. $L_t$ can be in a range from about 1 millimeter to about 20 millimeters, for example in a range from about 1 millimeter to about 10 millimeters. L2 may be in a range from about 1 to about 1.2 times Th1, for example in a range from about 1 to about 1.1, or in a range from about 1.1 to about 1.05. A length of Lt may be greater than about 1 millimeter, for example greater than about 1.5 millimeters, or in some embodiments greater than about 2 millimeters.

In some embodiments $\Delta n = n_c - n_L$ may be in a range from about −0.4 to about 0.8.

A width Th2 of the input facet can be in a range of 1 to 1.5 times a width Wd of the light source (e.g. LED), for example in a range from about 1 to about 1.25, or in a range from about 1 to about 1.1.

A width Wx of the channel may be in a range of 1 to 1.1 times Th1.

In another aspect a display device is described comprising a display panel, a backlight unit configured to illuminate the display panel, the backlight unit comprising a glass plate comprising a first major surface, a second major surface and a thickness Th1 therebetween, a light coupler bonded to the first major surface along an edge portion of the glass plate, the light coupler including at least one taper portion, and a light source positioned adjacent an input facet of the light coupler. The light coupler may comprise a base portion adjacent an edge surface of the glass light guide plate. In certain embodiments, Th1 divided by a width Th2 of the input facet can be in a range from about 0.5 to 1.0.

The light coupler may include a pair of taper portions bonded to the first and second major surfaces of the glass plate, respectively, and further include a channel sized to receive the glass plate, wherein the glass plate is positioned in the channel. The light coupler may further comprise a base portion extending between the pair of taper portions. The channel includes a bottom surface, and a length $L_t$ of the light coupler is equal to the sum of a distance L1 between the input facet and the bottom surface of the channel and a depth L2 of the channel. Accordingly, a ratio $L2/L_t$ may be in a range from about 0.1 to about 0.9. $L_t$ may be in a range from about 1 millimeter to about 20 millimeters. A width Wx of the channel can be equal to Th1.

The light guide plate comprises an index of refraction $n_L$, the light coupler comprises an index of refraction $n_c$, and $n_c-n_L$ can be in a range from about −0.4 to about 0.8, for example in a range from about −0.3 to about 0.3, or in a range from about −0.2 to about 0.2.

A width Th2 of the light coupler input facet can be in a range of 1 to 1.5 times a width Wd of the light source (e.g. LED), for example in a range from about 1 to about 1.25, or in a range from about 1 to about 1.1.

In another aspect, a light guide plate configured for use in a display device is disclosed comprising a glass plate including a first major surface, a second major surface opposite the first major surface, and a thickness Th1 therebetween, and a light coupler including at least one taper portion bonded to at least one of the first major surface and the second major surface of the glass plate. The light coupler may include a base portion adjacent an edge surface of the glass plate.

The light coupler includes an input facet with a width Th2, and Th1 divided by Th2 can be in a range from about 0.5 to 1.0.

In some embodiments the light coupler includes a pair of taper portions bonded to the first and second major surfaces of the glass plate, respectively, and may further comprise a base portion extending between the pair of taper portions. The light coupler may also include a channel sized to receive the glass plate, wherein the glass plate is positioned in the channel. The channel includes a bottom surface, and wherein a length $L_t$ of the light coupler is equal to the sum of a distance L1 between the input facet and the bottom surface of the channel and a depth L2 of the channel. Accordingly, a ratio $L2/L_t$ can be in a range from about 0.1 to about 0.9, for example in a range from about 0.1 and 0.9, or in a range from about 0.3 to about 0.9. A width Wx of the channel is in a range of 1 to 1.1 times Th1, including all ranges and subranges therebetween.

The glass plate comprises an index of refraction $n_L$, the light coupler comprises an index of refraction $n_c$, and $n_c-n_L$ can be in a range from about −0.4 to about 0.8, for example in a range from about −0.3 to about 0.3, or in a range from about −0.2 to about 0.2.

In still another aspect a method of making a light coupler is described comprising applying a mold assembly to an edge portion of a glass plate, the mold assembly including a cavity for receiving a polymer material, injecting the polymer material into the mold assembly, removing the mold assembly from the glass plate, and wherein the glass plate after removal of the mold assembly comprises a light coupler including at least one taper portion bonded to at least one of a first major surface and a second major surface of the glass plate along the edge portion. The polymer material may be, for example, a PMMA material or a polycarbonate material. The polymer material may be a UV curable material.

DETAILED DESCRIPTION

Figure 1:
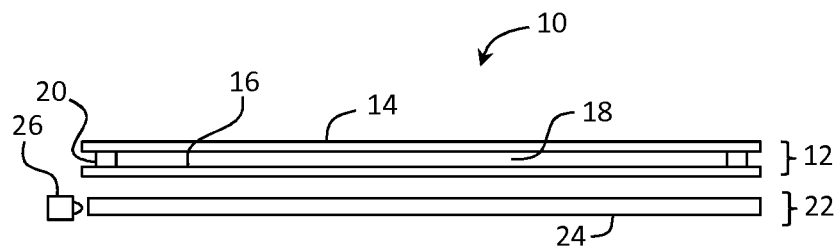
FIG. 1 is cross sectional side view of an example liquid crystal display device showing the display panel and the backlight unit.

A typical liquid crystal display device 10 is shown in FIG. 1. Components not essential to the current discussion have been omitted for clarity. Liquid crystal display device 10 comprises a liquid crystal display panel 12 comprising a top glass plate 14 (e.g. color filter), a bottom glass plate 16 (e.g. thin film transistor, TFT, backplane) and a liquid crystal material 18 disposed therebetween. Edge portions of the glass plates 14 and 16 are sealed with a sealing material 20, for example a UV-curable adhesive, thereby sealing the liquid crystal material between the top and bottom glass plates. Liquid crystal display device 10 further comprises a backlight unit 22 comprising a light guide plate 24 and a light source 26. Modern liquid crystal display devices typically comprise a light source arranged along one or more edges of the light guide plate and configured to inject light into the light guide plate along one ore more edges thereof. Light injected into the light guide plate propagates through the light guide plate and is scattered, for example by various diffusion and turning films, in a direction such that display panel 12 is illuminated by the backlight unit.

Figure 2:
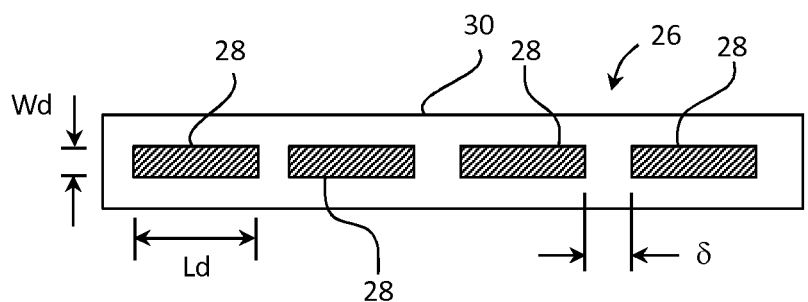
FIG. 2 is a top view of an example LED light source for use in the backlight unit of FIG. 1.

Referring to FIG. 2, a typical light source 26 used to illuminate an LCD display may be formed as a linear array of discrete light emitting diodes (LEDs) 28 mounted on a strip-shaped circuit board 30. The individual LEDs typically have a rectangular shape (for example, 7×2 millimeters, length Ld by width Wd, respectively) and adjacent LEDs in the array are separated by a gap δ of from about 2 to about 5 millimeters.

As previously stated, when considering glass as a replacement for PMMA, the material and manufacturing costs of the glass can have a significant impact on the overall cost of a backlight unit. Thus, from a pure cost basis, thinner glass is desirable. On the other hand, the relatively large size of individual LEDs used to illuminate display panel 12 compared to the thickness of the light guide plate can result in an inability to efficiently couple an optimal amount of light from the light source into the glass light guide plate, as the width dimension Wd of the individual LEDs can be considerably greater than the thickness of the glass light guide plate.

Figure 3:
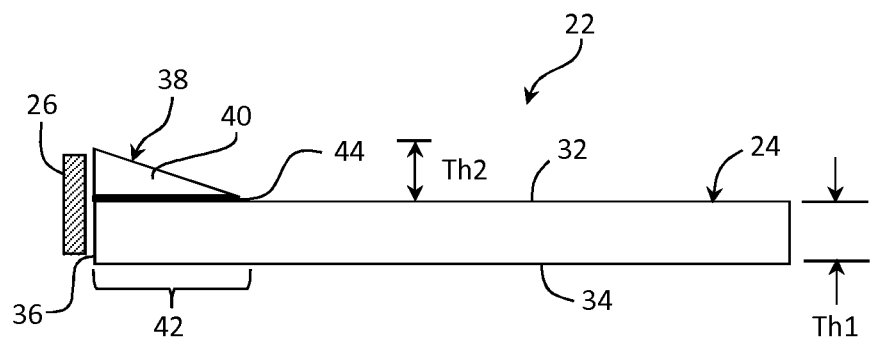
FIG. 3 is a cross sectional edge view of a backlight unit suitable for use with the liquid crystal display device of FIG. 1 and illustrating a light coupler bonded to a glass light guide plate of the backlight unit.
Figure 4:
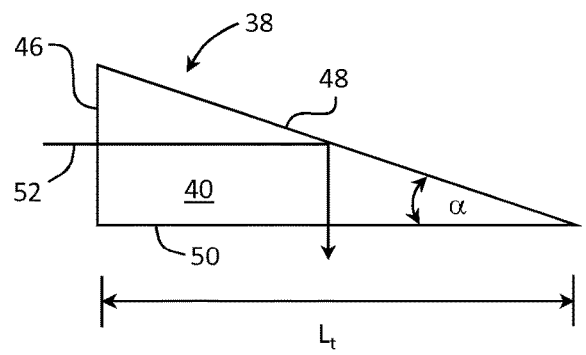
FIG. 4 is a close-up cross sectional view of the light coupler of FIG. 3 as seen from one end of the coupler.

Accordingly, in one embodiment shown in FIGS. 3 and 4, a backlight unit 22 is shown comprising a glass light guide plate 24 including a first major surface 32 and a second major surface 34 opposite first major surface 32. Light guide plate 24 further comprises at least one edge surface 36 extending between first major surface 32 and second major surface 34. A thickness Th1 of light guide plate 24 between first major surface 32 and second major surface 34 may be in a range from about 0.5 millimeters to about 3 millimeters, for example equal to or greater than 0.7 millimeters, equal to or greater than 1 millimeters, equal to or greater than 1.5 millimeters, or equal to or greater than 2 millimeters, including all ranges and subranges therebetween. In some embodiments, Th1 of light guide plate 24 may be equal to or greater than 3 millimeters. Backlight unit 22 may further comprise a light coupler 38 coupled to first major surface 32 (or second major surface 34) of light guide plate 24 at an edge portion 42 thereof. For example, light coupler 38 may be coupled to edge portion 42 with a refractive index matching adhesive 44.

As best seen in FIG. 4, light coupler 38 comprises a taper portion 40 including an input facet 46, a reflection facet 48 and an output facet 50. As described above, output facet 50 can be coupled to edge portion 42 of the glass light guide plate 24 with refractive index matching adhesive 44. Accordingly, reflection facet 48 forms an angle α with output facet 50, wherein α is hereinafter referred to as the taper angle. Light coupler 38 further comprises a taper length $L_t$, which is the distance between input facet 46 and the apex where reflection facet 48 and output facet 50 converge. Taper length $L_t$ may be in a range from about 5 millimeters to about 30 millimeters, including all ranges and subranges therebetween, for example in a range from about 10 millimeters to about 20 millimeters.

Still referring to FIG. 4, light ray 52 produced by light source 26 (not shown in FIG. 4) enters input facet 46 and strikes reflection facet 48 at an angle by which the light ray is totally internally reflected from reflection facet 48 so that light ray 52 exits output facet 50 and enters into edge portion 42 of light guide plate 24.

Figure 5:
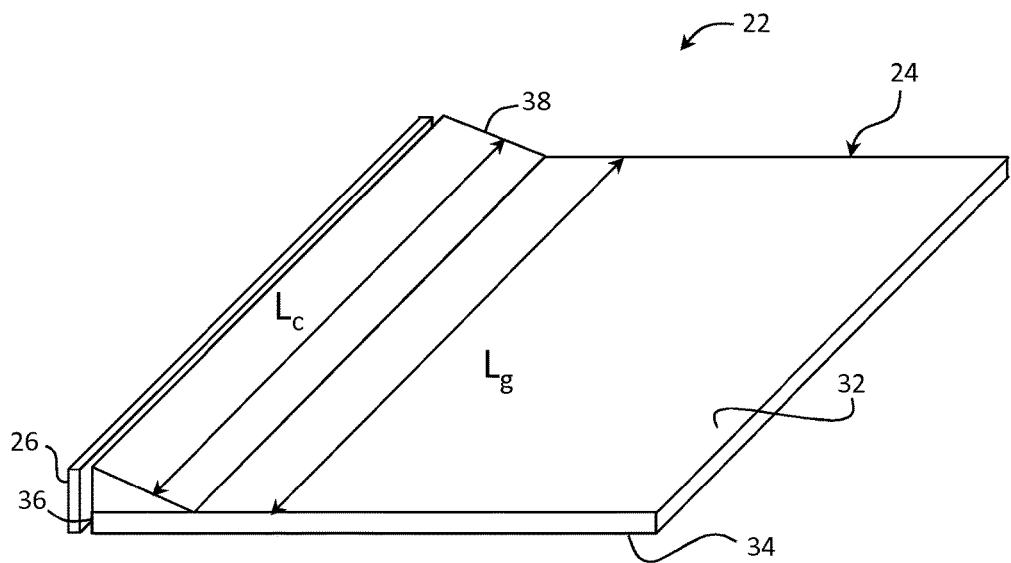
FIG. 5 is a perspective view of the backlight unit of FIG. 3.

FIG. 5 shows a perspective view of backlight unit 22 is attached to a glass light guide plate 24. As shown in FIG. 5, edge surface 36 of light guide plate 24 has a length $L_g$, and light coupler 38 has a length $L_c$. $L_c$ may be equal to or less than $L_g$. In some embodiments $L_c$ may be equal to or greater than about 80% of $L_g$, equal to or greater than 85% of $L_g$, or equal to or greater than 90% of $L_g$, or even equal to or greater than 95% of $L_g$.

The coupling efficiency of light coupler 38 is a function of two major parameters, the light coupler taper length $L_t$ and the taper ratio TR, calculated as TR=Th1/Th2, where Th1 is the thickness of the glass light guide plate and Th2 is the length of input facet 46.

Figure 6:
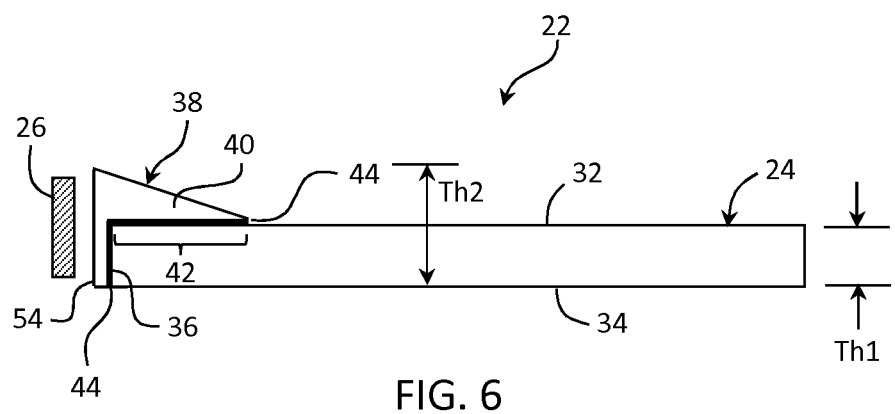
FIG. 6 is a cross sectional edge view of a backlight unit suitable for use with the liquid crystal display device of FIG. 1 and illustrating another embodiment of a light coupler bonded to a glass light guide plate of the backlight unit.
Figure 7:
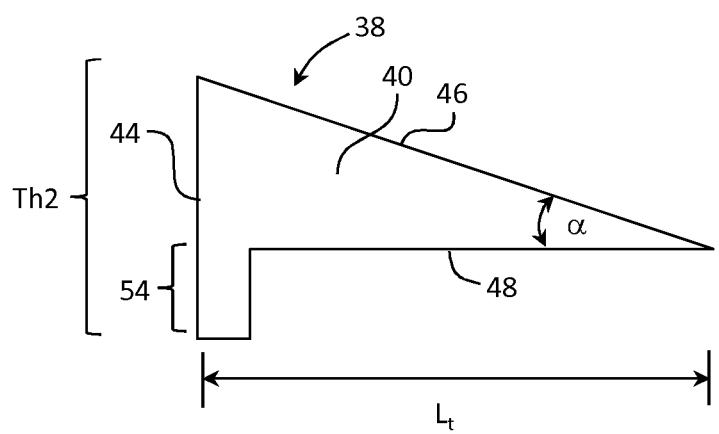
FIG. 7 is a perspective view of the backlight unit of FIG. 6.

In another embodiment shown in FIGS. 6 and 7, light coupler 38 may include a base portion 54 that extends adjacent to edge surface 36 of light guide plate 24. Base portion 54 may be coupled to edge surface 36 with refractive index matching adhesive 44. Base portion 54 can protect the vulnerable edge of the glass light guide. Moreover, if edge surface 36 includes surface roughness, optically bonding base portion 54 to edge surface 36 with a refractive index matching material can minimize scattering induced by such roughness.

In general, the taper length $L_t$ should be made as small as possible, since the light coupler may be hidden by a display panel bezel positioned around edges of the display panel, and thin bezels are usually desirable. Also, to obtain the thinnest practical glass light guide plate, taper ratio TR should also be as small as possible, for example in a range from about 0.25 to about 1.5, including all ranges and subranges therebetween.

Figure 8:
FIG. 8 is a plot showing the calculated coupling efficiency for several light coupler dimensions/characteristics.

The plot depicted in FIG. 8 shows the calculated coupling efficiency (Fresnel losses are neglected) as a function of Th1 assuming that Th2 is 2 millimeters and further considering taper lengths $L_t$ of 10 millimeters and 20 millimeters (curves 56 and 57 respectively). A taper length $L_t$ in a range from about 10 millimeters to about 20 millimeters and a taper ratio Th1/Th2 in a range from about 0.5 to about 1.0, for example about 0.75, represent examples of suitable light coupler attributes.

Simulations have indicated that small differences between the index of refraction of the light coupler material and the index of refraction of the light guide plate do not significantly impact performance of the light coupler, and differences between the index of refraction of the light coupler material and the index of refraction of the light guide plate up to about +/−0.05 can be tolerated without significant additional optical coupling losses.

Figure 9:
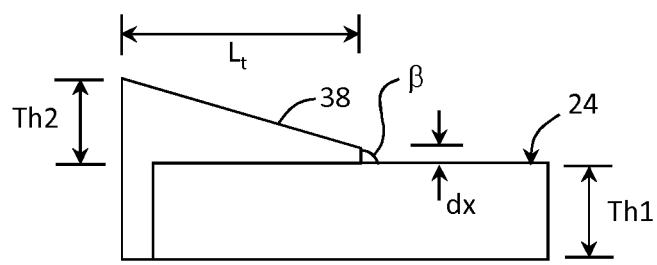
FIG. 9 is a cross sectional end view of still another light coupler configuration.

Depending on the manufacturing process, producing a light coupler whose thickness tends toward zero at an end of the taper, may be challenging, so in some embodiments light coupler 38 can be formed with a step at one end of the taper length $L_t$, as shown in FIG. 9. That is, the apex of the light coupler opposite input facet 46 is truncated. The step may have an angle β of 90 degrees relative to first major surface 32 (or second major surface 34). However, angle β may be an angle up to about 120 degrees. If the step amplitude dx becomes too large, light coupled into light coupler 38 may leak into the surrounding air and the coupling of light into light guide plate 24 can drop significantly.

As an example, assuming Th1=1.5 millimeters and Th2=0.5 millimeters, and further assuming a 10 millimeter taper length $L_t$, the maximum step amplitude dx is about 0.1 millimeters to obtain a coupling efficiency of about 90%. A typical step dx should be:

$$0 < dx \leq (Th2-Th1)/5 \quad \quad 1)$$

Thus, in certain embodiments, $0 < |dx| \leq 0.5$, $0 < |dx| \leq 0.45$, $0 < |dx| \leq 0.3$, $0 < |dx| \leq 0.2$ or $0 < |dx| \leq 0.1$.

Figure 10A:
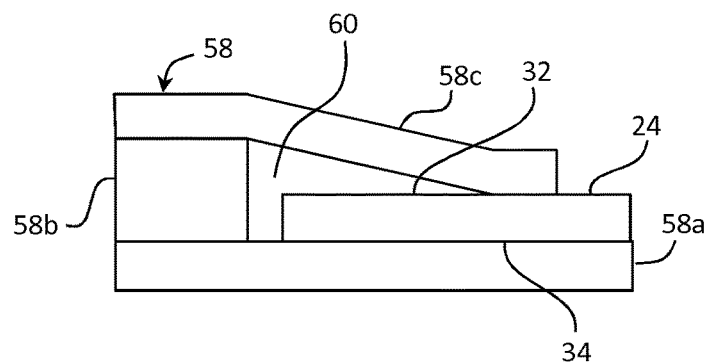
FIG. 10A-10C are cross sectional representation of various stages of molding a light coupler directly to a glass light guide plate.
Figure 10B:
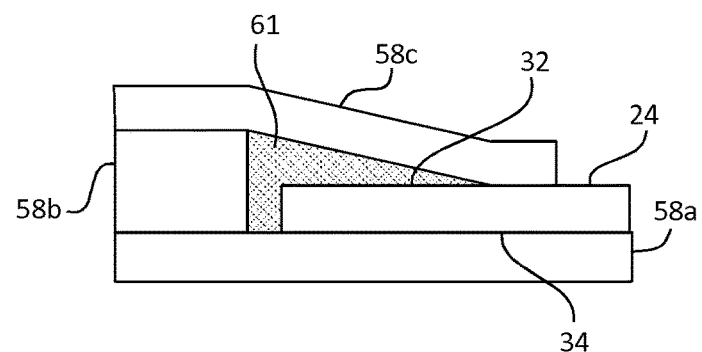
Figure 10C:
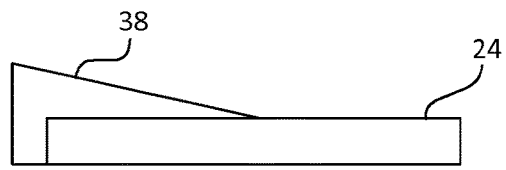
Figure 11:
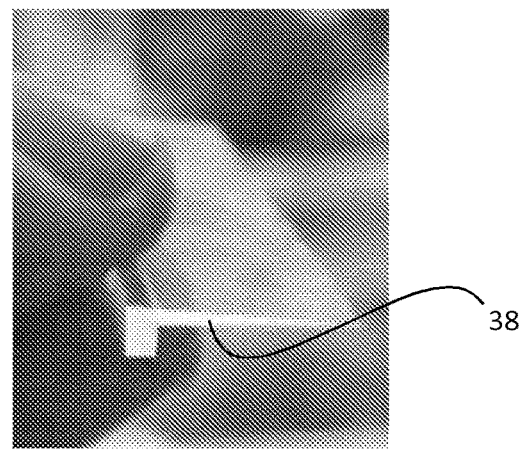
FIG. 11 is a photograph of a sample light coupler.

Manufacture of a suitable light coupler can be approached in several ways. For example, in one embodiment, shown in FIGS. 10A through 10C, a transparent UV curable resin can be injected into a mold attached to a major surface of the glass light guide plate, e.g. first major surface 32 or second major surface 34. In the embodiment depicted in FIGS. 10A through 10C, the mold 58 is a multi-part mold comprising sections 58a, 58b and 58c. In a first step, mold 58 is formed about edge portion 42. To inject the polymer resin that will form the light coupler, holes (not shown) can be drilled through a section of the mold, for example section 58b. The position of the injection hole or holes should be such that they line up with the gap between the LED's in the array. Additional holes can be used to allow air to exhaust from the mold as the polymer resin is injected into cavity 60 defined by the mold and glass light guide plate 24. Next, as depicted in FIG. 10B, a polymer resin 61 is injected into cavity 60. To eject the light coupler easily from the mold once the polymer resin is cured, portions of the mold, such as portion 58c, can be made of a low elastic modulus material such as silicone, making the mold easily removable from the formed light coupler. FIG. 10C illustrates light coupler 38 after removal of the mold. In the present embodiment, a refractive index matching adhesive may not be necessary, as light coupler 38 can be formed directly on the glass light guide plate. A photograph of a manufactured coupler is shown in FIG. 11.

Figure 12:
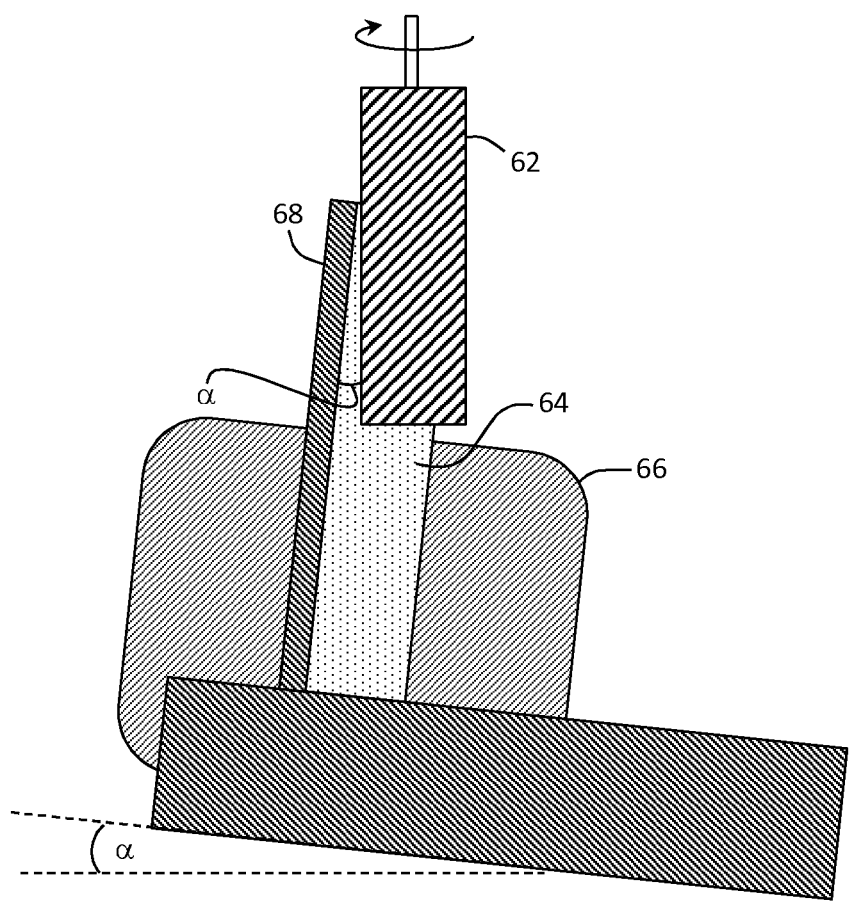
FIG. 12 is a cross sectional side view showing the milling of a polymer blank to form a light coupler.
Figure 13:
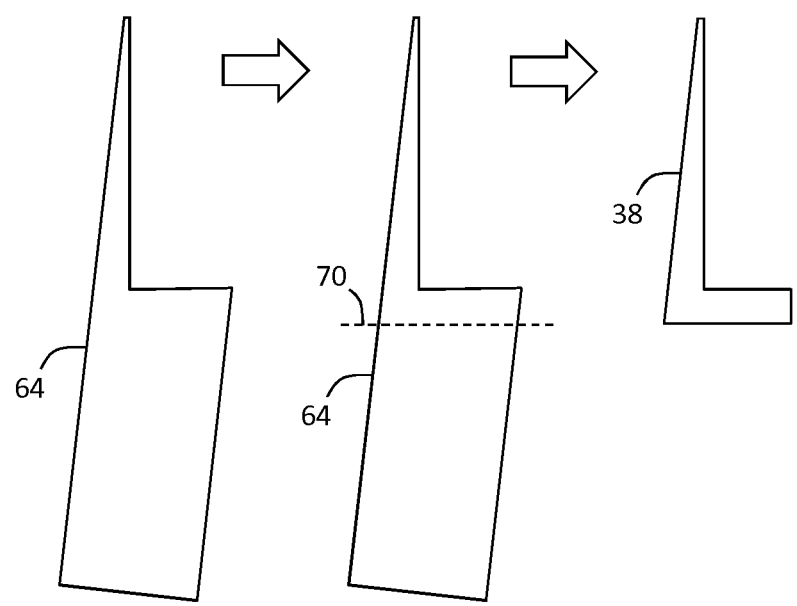
FIG. 13 shows final forming stages of the milled blank from FIG. 12.

Sample tapered forms have been machined on a vertical axis milling machine equipped with a 3 millimeter diameter tungsten carbide cutting tool 62 (FIG. 12). In accordance with FIG. 12, a polymer (e.g. PMMA) blank 64 is secured in an inclined vice 66 in order to present a suitable taper angle α, for example 3.18°. A stiffening member 68 may be used to add rigidity to the polymer blank during milling. Since only the inner side of the light coupler (e.g. output facet 50) has been machined, that side will be bonded to the glass light guide plate using an epoxy with a cured index of refraction that substantially matches the refractive index of the light coupler material. Bonding with an index-matching adhesive can minimize or eliminate scattering due to machining-induced surface roughness. FIG. 13 illustrates the progression of the milled polymer blank. Once the output facet 50 has been formed, the polymer blank may be cut along dashed line 70 to produce light coupler 38. Assuming an LED height of 2 millimeters, and a glass light guide plate 1.5 millimeters thick (Th1), ideally, the light coupler 38 would converge along the length $L_t$ direction to a thickness of zero where the reflection facet and the output facet meet. However, since a zero thickness is unrealistic and non-achievable with common machining tools, a suitable target minimum tip thickness can be, for example, 50 μm.

Manipulating such tiny parts as light coupler 38 with an overall length $L_c$ of 1 meter or more for large LCD displays may be impractical. Accordingly, in further embodiments multiple parts can be fabricated and attached to the glass light guide side-by-side, thereby concatenating multiple parts with lengths much less than $L_g$ to achieve the desired length $L_c$. This may also help to avoid delamination due to temperature changes and differential coefficients of thermal expansion.

Figure 14A:
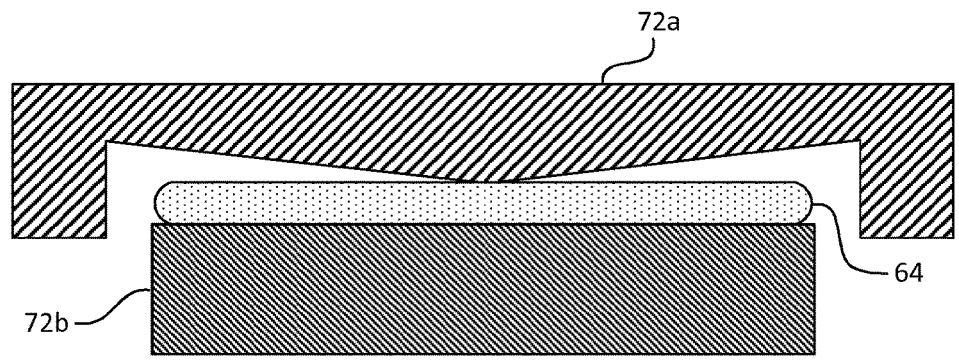
FIG. 14A-14C are cross sectional side views illustrating various stages of compression molding of a light coupler.
Figure 14B:
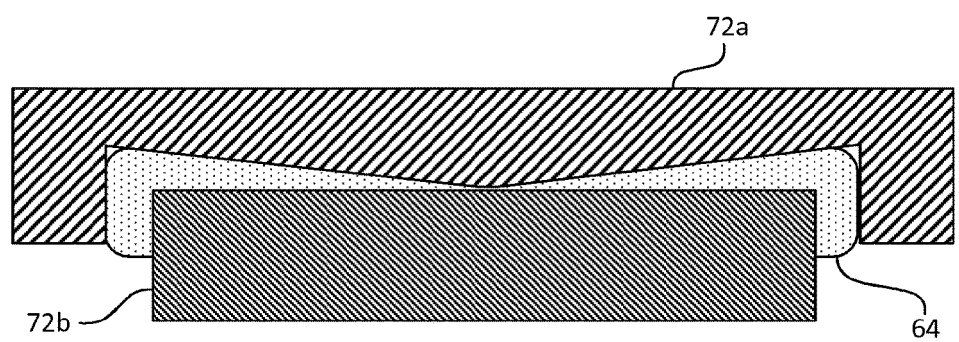
Figure 14C:
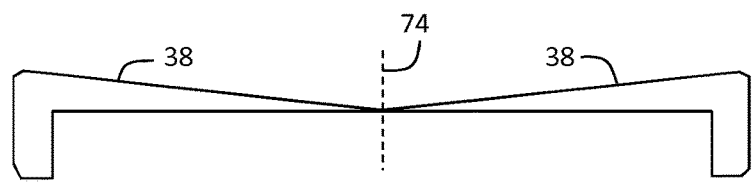

In still another embodiment shown in FIGS. 14A through 14C, a 1 millimeter thick PMMA blank can be formed into a suitable light coupler by compression molding. This technique is similar to injection molding, but does not require heavy equipment for prototyping. The technique employs compressing a heated polymer blank 64 between two polished half-molds, i.e. sections 72a and 72b. In some cases, two light couplers 38 can be formed simultaneously to balance compression forces. The couplers may be joined, thus cutting at dashed line 74 will separate the joined couplers into individual components. Nevertheless, the present compression technique presents limits in geometrical control and also potential polymer degradation due to the high temperature required for sufficiently low viscosity forming.

Figure 15A:
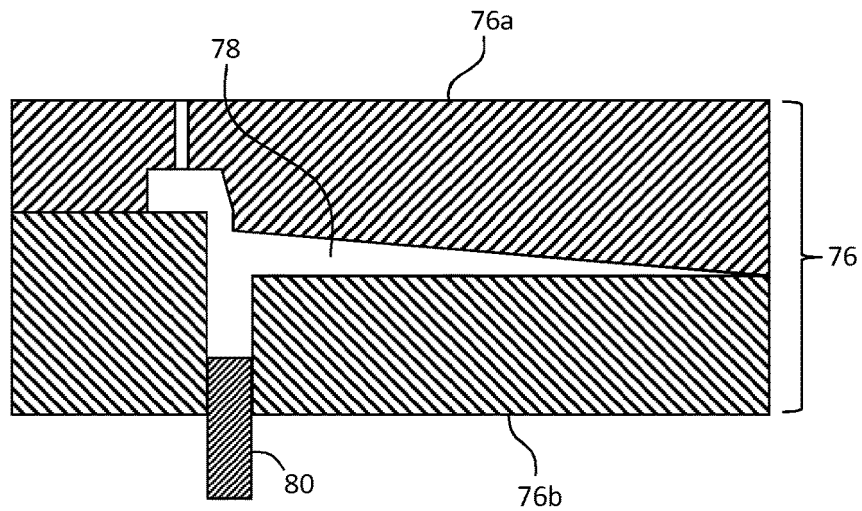
FIG. 15A-15C are cross sectional side views illustrating various stages of injection molding of a light coupler.
Figure 15B:
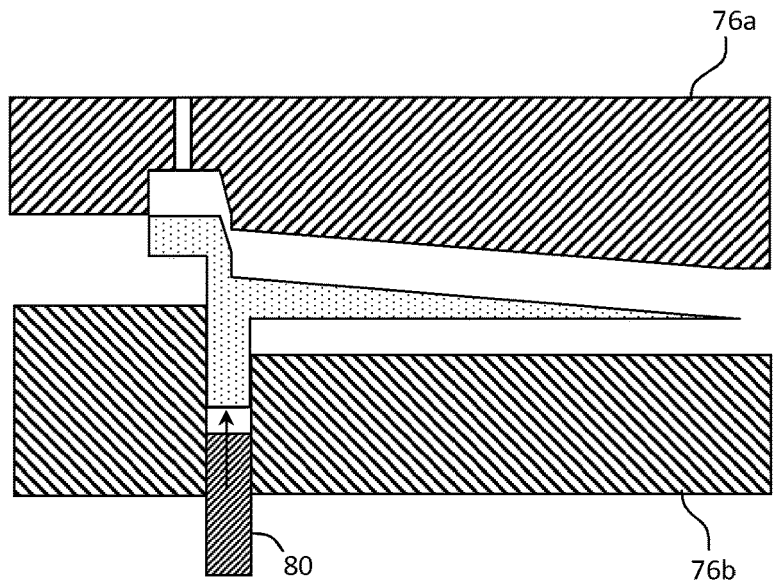
Figure 15C:
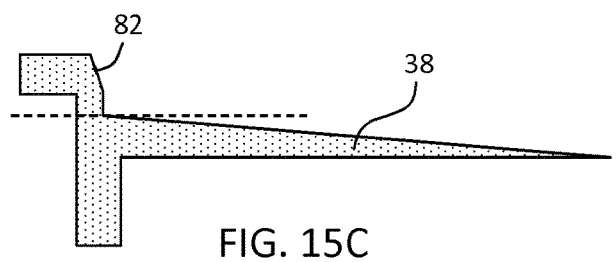

In yet another embodiment illustrated in FIG. 15A through 15C, injection molding can be used in conjunction with an open-able mold 76 made of 2 complementary parts, 76a and 76b. Assembled, mold parts 76a and 76b form a cavity 78 therebetween into which a molten polymer or a polymer resin is injected. After injection of the molten polymer (PMMA or polycarbonate for example) into cavity 78 at about 120-140° C., mold 76 is opened and one or more ejectors 80 can be used to push the injected piece from the mold cavity. The injection molded light coupler is then separated from its injection sprue 82, for example at dashed line 84, with a hot wire cutting method for example, to form light coupler 38 as shown in FIG. 15C.

Figure 16:
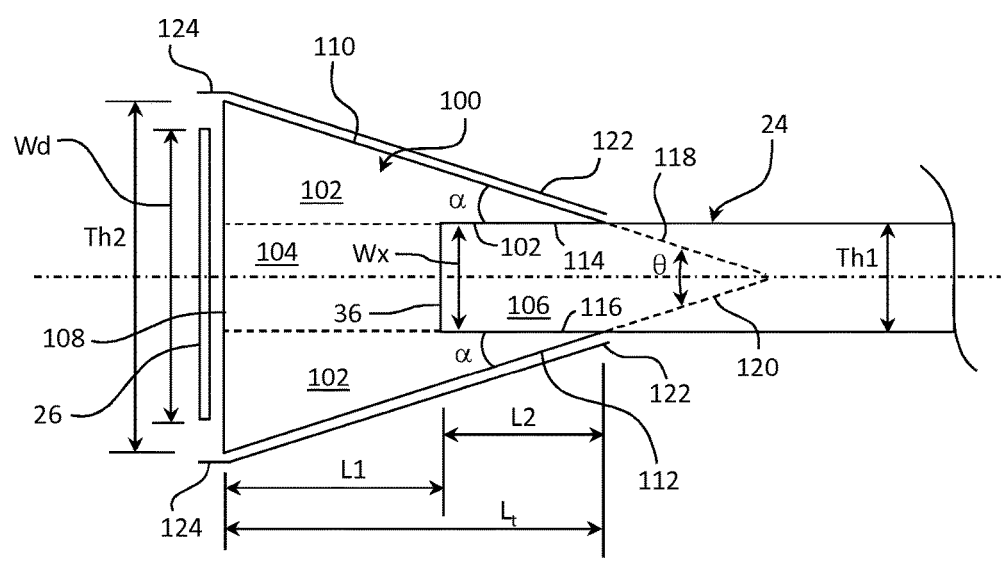
FIG. 16 is a cross sectional end view of another example light coupler according to the present disclosure.

In still another embodiment a light coupler 100 is illustrated in a cross section perpendicular to the length $L_c$ of the light coupler in FIG. 16, and is shown comprising two taper portions 102 joined by a base portion 104. In some embodiments taper portions 102 and base portion 104 may be separate sections that may be bonded together, for example with an index-matching adhesive. However, in certain other embodiments, the taper portions and the base portion may be a homogeneous component. That is, light coupler 100 may be molded or machined as a single, homogeneous piece by any of the foregoing methods.

Light coupler 100 may be a quasi-triangular shape comprising a channel 106 sized to receive light guide plate 24. Light coupler 100 includes an input facet 108 having a width Th2, a first reflection facet 110 and a second reflection facet 112, wherein first reflection facet 110 and second reflection facet 112 each form an angle α with a respective output facet 114, 116. Light coupler 100 includes a length L1 between input facet 108 and the bottom 115 of channel 106, and wherein channel 106 includes a depth L2. Together, L1 and L2 represent the total distance between input facet 108 and the farthest extent of light coupler 100 in a direction perpendicular to input facet 108. $L_t$, which is the sum of L1 and L2, is the coupler length. Phantom lines 118 and 120 respectively represent extensions of reflection facets 110 and 112, which converge at an angle θ, where θ=2·α. Light coupler 100 may be formed, for example, from a polymer material and comprises an index of refraction $n_c$. In short, light coupler 100 is illustrated in cross section as a truncated triangle, for example a truncated isosceles triangle that includes a channel 106 formed at one apex, and wherein the length of reflection facet 110 is equal to the length of reflection facet 112. A width of channel 106 is equal to or slightly greater than the thickness Th1 of the light guide plate 24. In some embodiments, reflecting members 122 may be positioned adjacent reflection facets 110, 112. In some embodiments, reflecting members 124 are positioned adjacent the gap between light source 26 and light coupler 100. Reflecting members 122 and 124 may be used together or individually. That is, in some embodiments reflecting members 122 may be used, in other embodiments reflecting members 124 may be used, and in still other embodiments reflecting members 122 and 124 may both be used.

Figure 17:
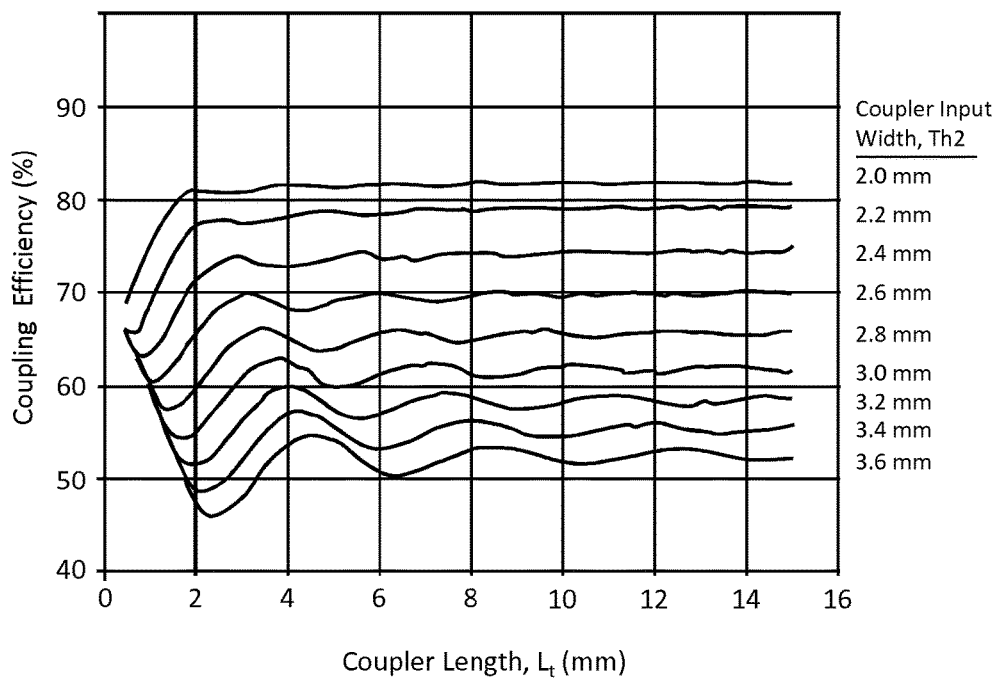
FIG. 17 is a graph illustrating modeled optical coupling efficiency as a function of coupler length L for various widths Th2 of the input facet of the light coupler of FIG. 16.

FIG. 17 is a graph illustrating modeled optical coupling efficiency as a function of coupler length $L_t$ for various input facet widths Th2 (i.e. length of input facet 108). The light guide plate thickness Th1 was 1.5 millimeters and the index of refraction $n_L$=1.5 of the light guide plate 24 was equal to the index of refraction of the light coupler $n_c$. The width Wx=1.5 millimeters of channel 106 was equal to the thickness Th1 of light guide plate 24. The width Wd of the LED light source was assumed to be 2 mm, with a gap of 0.1 mm separating the LED from input facet 108. No reflecting members were employed. The data show that for the dimension of the input facet 108 (i.e. Th2), beginning at the bottom-most curve and progressing upward, 3.6 millimeters, 3.4 millimeters, 3.2 millimeters, 3.0 millimeters, 2.8 millimeters, 2.6 millimeters, 2.4 millimeters, 2.4 millimeters, 2.2 millimeters and 2.0 millimeters, coupling efficiency increased from a low of about 46% for a coupler length $L_t$ of approximately 2 millimeters to a high of about 82% over a range of coupler lengths from about 4 millimeters to about 15 millimeters. The data also show that as the input facet width Th2 decreased from 3.6 to 2.0 millimeters, the coupling efficiency as a function of coupler length $L_t$ increased and became more consistent. It is apparent from the graph that for a coupler input facet width Th2=3.6 the sinusoidal character of the coupling efficiency over the coupler length range from about 2 millimeters to about 15 millimeters is quite pronounced, whereas for a coupler input facet width Th2=2.0 millimeters, the coupling efficiency is very uniform over the coupler length range of about 4 millimeters to about 15 millimeters. The data further show that greater coupling efficiency can be achieved when the input facet width Th2 is approximately the same as the width Wd of the LEDs.

Figure 18:
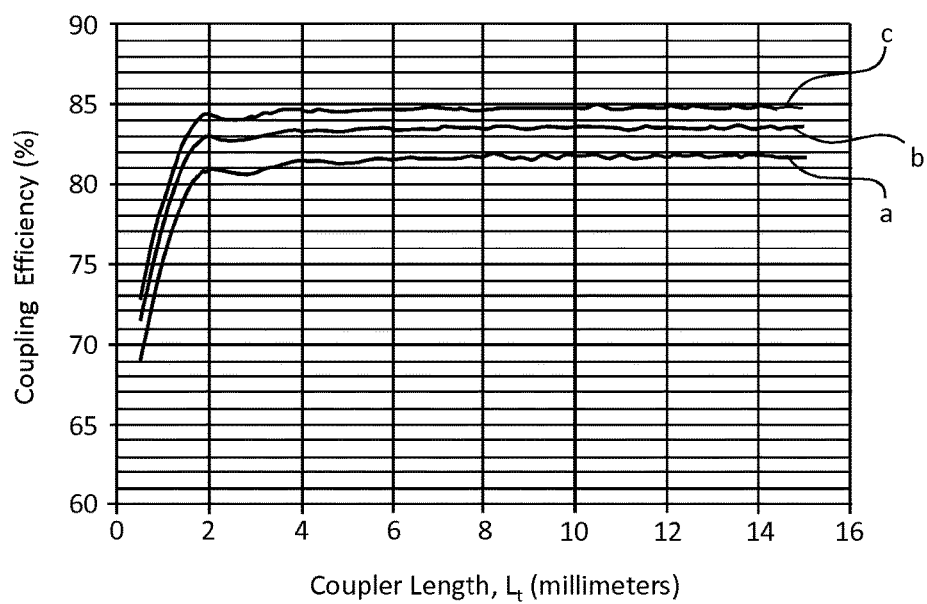
FIG. 18 is a graph illustrating modeled optical coupling efficiency for light coupler 100 as a function of coupler length $L_t$ for an embodiment a) without reflecting members, b) reflecting members with a 99% Lambertian reflectivity, and c) reflecting members with a 99% mirror (specular) reflection.

FIG. 18 is a graph illustrating modeled optical coupling efficiency for light coupler 100 as a function of coupler length $L_t$ for an embodiment a) without reflecting members, b) reflecting members 122 and 124 with a 99% Lambertian reflectivity, and c) reflecting members 122 and 124 with a 99% mirror (specular) reflection. The light guide plate thickness Th1 was 1.5 millimeters and the index of refraction $n_L$=1.5 of the light guide plate 24 was equal to the index of refraction of the light coupler $n_c$. The width Wx=1.5 millimeters of channel 106 was equal to the thickness Th1 of light guide plate 24. The width Wd of the LED light source was assumed to be 2 mm, with a gap of 0.1 mm separating the LED from input facet 108. The data show that the use of specular reflecting members adjacent the light coupler reflecting surfaces and adjacent the gap between the light source 26 and input facet 108 is effective to increase the coupling efficiency. The data also show that for the parameters described above, coupling efficiency is dramatically increased from a low of about 70% at a coupler length $L_t$ equal to approximately 1 millimeter, to an approximately uniform coupling efficiency at about 4 millimeters and beyond (for example, up to 15 millimeters).

Figure 19:
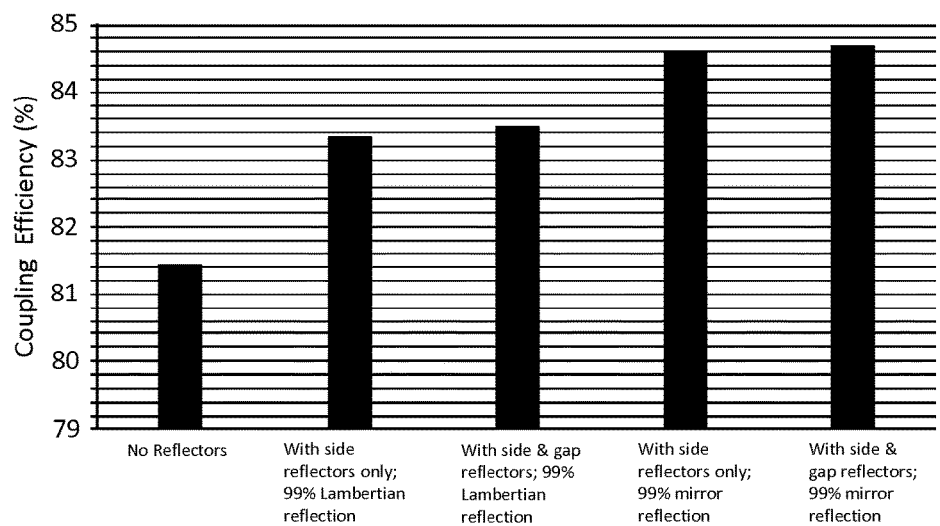
FIG. 19 is another graph illustrating the impact of reflecting members adjacent the reflecting facets of the light coupler of FIG. 16 on coupling efficiency.

FIG. 19 is another graph illustrating the impact of reflecting members adjacent the reflecting facets of light coupler 100 on coupling efficiency. From left to right the data show the effect of no reflecting members adjacent the reflecting facets of light coupler 100; using reflecting members 124 with a lambertian reflectance; using reflecting members 122 and 124 with a lambertian reflectance, using reflecting members 124 with a specular reflectance, and using reflecting members 122 and 124 with a specular reflectance. As for FIG. 18, the data show marked improvement when reflecting members are used. This is particularly true when the reflecting members have a specular reflectance. There is minimal difference regarding the use of reflecting members 124. That is, with a lambertian reflectance, incorporating reflecting members 124 in conjunction with reflecting members 122 provides only about a 0.2% improvement in coupling efficiency compared to using reflecting members 122 alone. Meanwhile, with a mirror (specular) reflectance, incorporating reflecting members 124 in conjunction with reflecting members 122 doesn't provide improvement in coupling efficiency compared to using reflecting members 122 alone.

Figure 20:
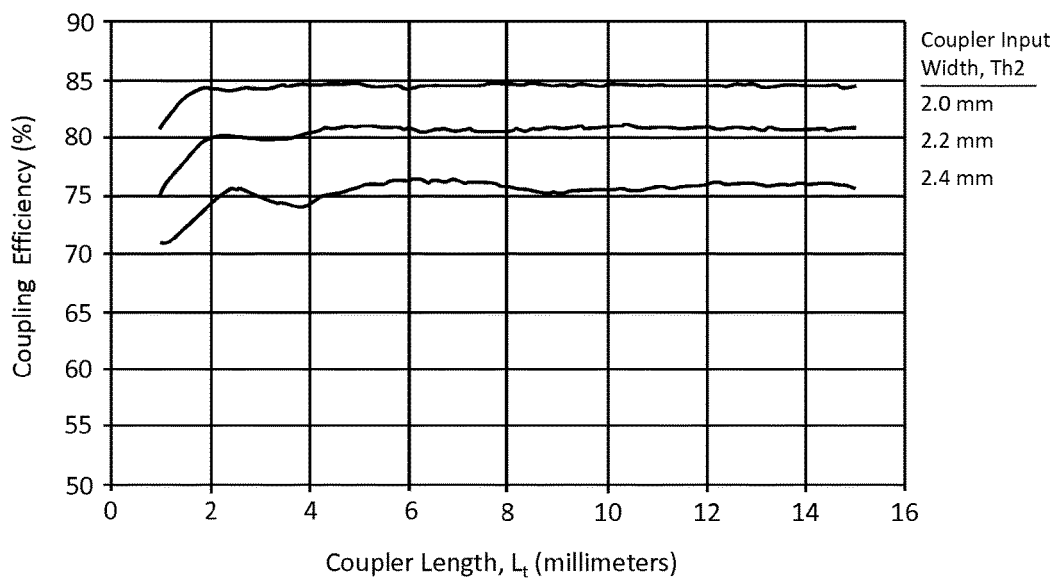
FIG. 20 is a graph illustrating modeled coupling efficiency as a function of coupler length for three coupler input widths Th2 where a refractive index difference Δn between the index of refraction $n_L$ of the light guide plate and the index of refraction $n_c$ of the light coupler was +0.1.

FIG. 20 is a graph illustrating modeled coupling efficiency as a function of coupler length for three coupler input facet widths Th2, from top to bottom 2.0 millimeters, 2.2 millimeters and 2.4 millimeters. The index of refraction $n_c$ of the light coupler was 1.4 while the index of refraction of the light guide plate 24 was 1.5. The width Wx of the light coupler output was 1.5 millimeters, equal to the thickness of the light guide plate. The ratio $L2/L_t$ between the coupler length and the channel depth was 0.5. The LED was assumed to have a width Wd of 2 millimeters. The data show that as Th2 increased (e.g. α increased), the coupling efficiency decreased. As in the previous graphs, the coupling efficiency also became more uniform for coupler lengths $L_t$ greater than about 4 millimeters, e.g. between about 4 millimeters and 15 millimeters.

Figure 21:
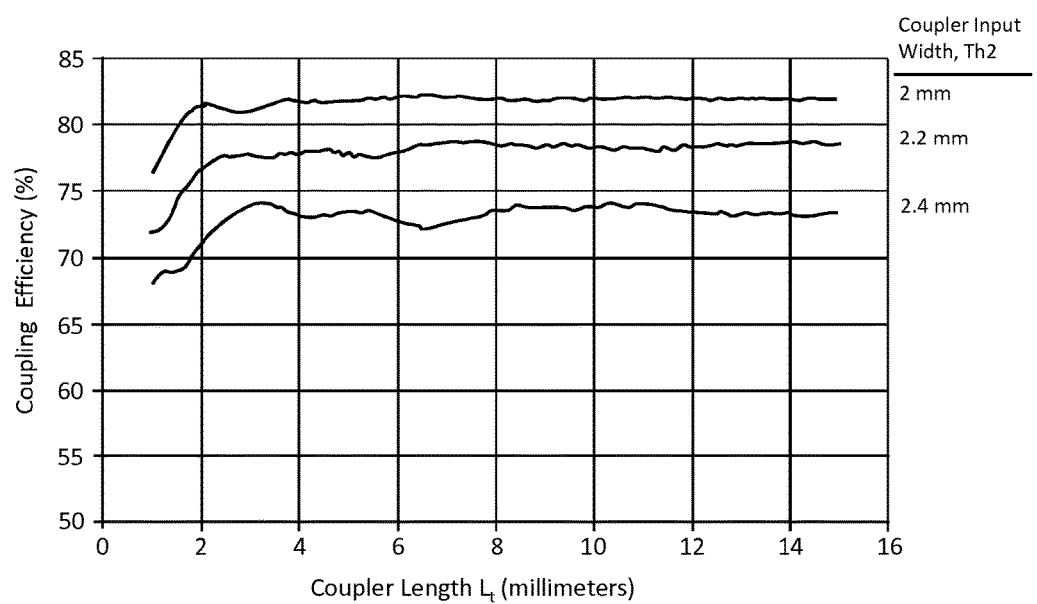
FIG. 21 is a graph illustrating modeled coupling efficiency as a function of coupler length for three coupler input widths Th2 where a refractive index difference Δn between the index of refraction $n_L$ of the light guide plate and the index of refraction $n_c$ of the light coupler was −0.1.

FIG. 21 is the same as FIG. 20 with the exception that the index of refraction $n_c$ of the light coupler was increased to 1.6. The data show similar behavior as depicted in FIG. 20, but with a lower overall coupling efficiency for each input facet width Th2.

Figure 22:
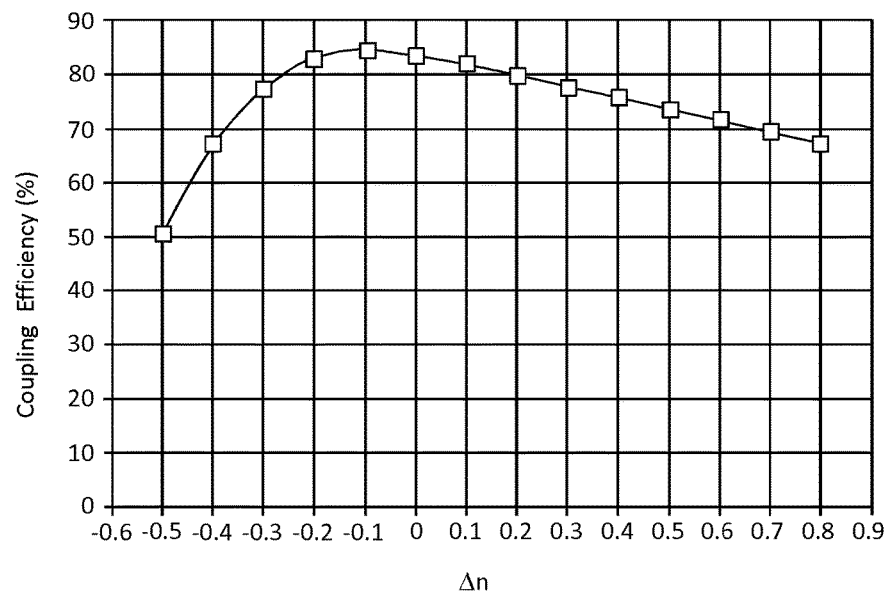
FIG. 22 is a graph illustrating modeled coupling efficiency as a function of the difference in index of refraction (Δn) between the light guide plate ($n_L$) and the light coupler ($n_c$)

FIG. 22 is a graph illustrating modeled coupling efficiency as a function of the difference in index of refraction between the light guide plate ($n_L$) and the light coupler ($n_c$), i.e. $\Delta n = n_c - n_L$. The coupler length $L_t$ was assumed to be 4 millimeters while the channel depth L2 was assumed to be 2 millimeters. The width of the light coupler output Wx was assumed to be the same as the thickness Th1 of the light guide plate, i.e. 1.5 mm. As before, the LED was assumed to have a thickness Wd of 2 millimeters with a gap between the LED and the input facet equal to 0.1 mm. The data show that optimal coupling efficiency can be achieved when the index of refraction of the light coupler is approximately equal to the index of refraction of the light guide plate, i.e. wherein an absolute value of the index of refraction difference is $|\Delta n|=0.1$. However, the data also show that acceptable coupling efficiency (e.g. equal to or greater than 80%) can be achieved for $0<|\Delta n|\leq 0.25$, for example $0<|\Delta n|\leq 0.20$.

Figure 23:
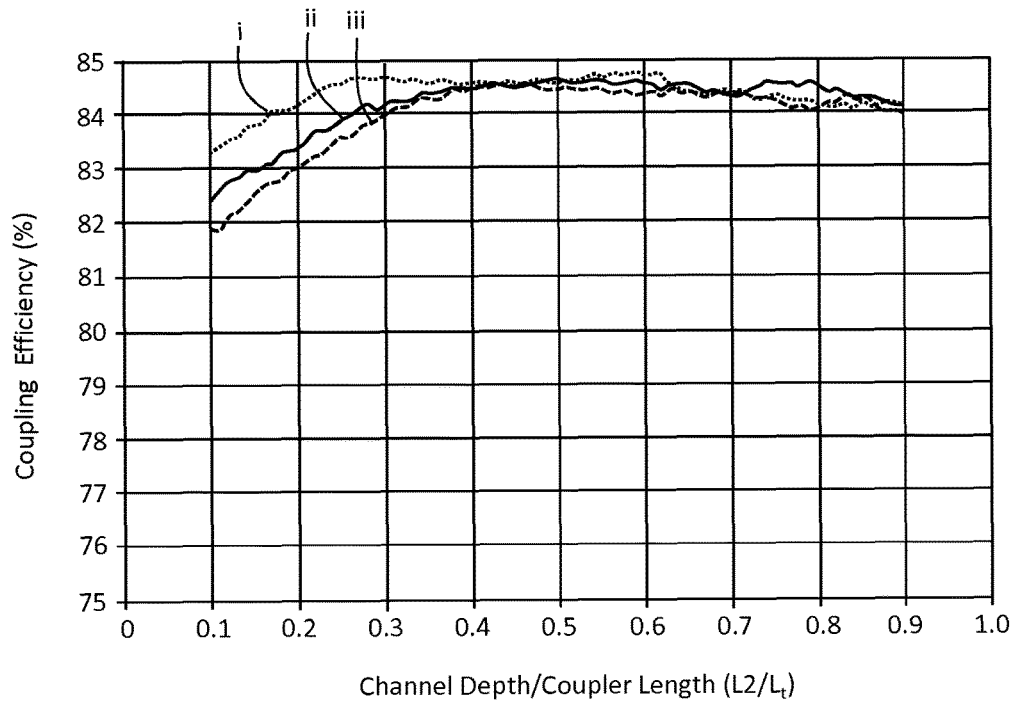
FIG. 23 is a graph showing modeled coupling efficiency as a function of the ratio between the channel depth L2 and the coupler length, i.e. $L2/L_t$ for three coupler lengths, wherein the refractive indexes of the light coupler and light guide plate are 1.4 and 1.5, respectively.

FIG. 23 is a graph showing modeled coupling efficiency as a function of the ratio between the channel depth L2 and the coupler length, i.e. $L2/L_t$ for three coupler length, i) 5 millimeters, ii) 10 millimeters, and iii) 15 millimeters. The index of refraction of light coupler 100, $n_c$, was equal to 1.4 and the index of refraction of the light guide plate 24, $n_L$, was 1.5. The width of the coupler output, Wx, was assumed to be equal to the thickness Th1 of the light guide plate, i.e. 1.5 millimeters. The LED width Wd was assumed to be 2 millimeters, with a gap between the LED and the input facet 46 equal to 0.1 millimeters. The width of the coupler input facet Th2 was assumed to be equal to the LED width Wd. The data show that as the ratio L2/$L_t$ increased from 0.1 to about 0.4, the shorter coupler lengths demonstrated greater coupling efficiency. However, the data also show that the coupling efficiency converged at a ratio of about 0.4, and the coupling efficiencies for the three coupler lengths remained substantially uniform thereafter, i.e. up to a ratio of about 0.9.

Figure 24:
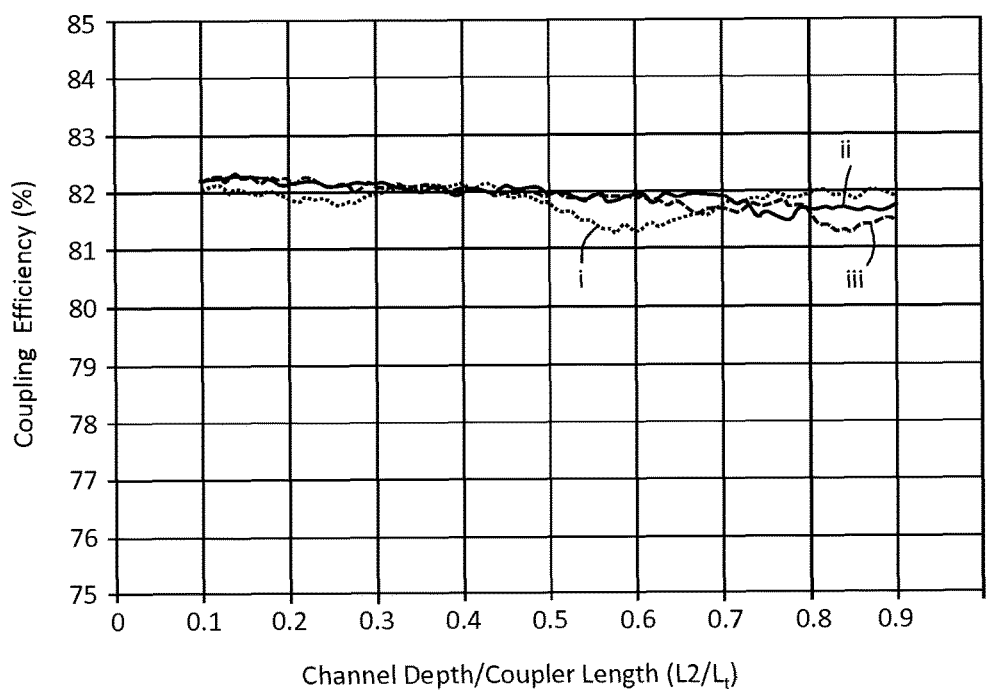
FIG. 24 is a graph of modeled coupling efficiency as a function of $L2/L_t$ under the same conditions as presented for FIG. 23, with the exception that the index of refraction difference between the light coupler ($n_c$=1.6) and the light guide plate ($n_L$=1.5) was reversed.

FIG. 24 is a graph of modeled coupling efficiency as a function of L2/$L_t$ under the same conditions as presented for FIG. 23, with the exception that the index of refraction difference between the light coupler (nc=1.6) and the light guide plate ($n_L$=1.5) was reversed. That is, $\Delta n = n_c - n_L$ was +0.1 rather than −0.1. The data show a coupling efficiency that is relatively uniform over a ratio (L2/L) range from 0.1 to 0.9, but with an overall coupling efficiency that is about 2.5% less than the scenario wherein $\Delta n = n_c - n_L$ is negative, suggesting it is more desirable to utilize a slightly negative $\Delta n$ (i.e. wherein the index of refraction of the light guide plate 24 is slightly greater than the index of refraction of the light coupler 100).

It will be apparent to those skilled in the art that various modifications and variations can be made to the embodiments disclosed herein without departing from the spirit and scope of the disclosure. For example, the light guide plate according to embodiments described herein may be used for general lighting applications, and need not be employed with a backlight unit or display device. Thus it is intended that the present disclosure cover the modifications and variations of these embodiments provided they come within the scope of the appended claims and their equivalents.

What is claimed is:

1. A backlight unit comprising:
a glass plate comprising a first major surface, a second major surface and a thickness Th1 therebetween; and
a light coupler coupled to the glass plate comprising at least one taper portion extending over and bonded to at least one of the first major surface or the second major surface along an edge portion of the glass plate; and
a light source positioned adjacent an input facet of the light coupler, wherein a width Th2 of the input facet is in a range of 1 to 1.5 times a width Wd of the light source.

2. The backlight unit according to claim 1, wherein the light coupler comprises a base portion adjacent an edge surface of the glass plate.

3. The backlight unit according to claim 1, wherein Th1 divided by a width Th2 of the input facet is in a range from about 0.5 to 1.0.

4. The backlight unit according to claim 1, wherein the light coupler includes a pair of taper portions bonded to the first and second major surfaces, respectively.

5. The backlight unit according to claim 4, wherein the light coupler includes a channel and the glass plate is positioned within the channel.

6. The backlight unit according to claim 4, wherein the glass plate comprises an index of refraction $n_L$, the light coupler comprises an index of refraction $n_c$, and $n_c - n_L$ is in a range from about −0.4 to about 0.8.

7. The backlight unit according to claim 5, wherein the channel includes a bottom surface, and wherein a length $L_t$ of the light coupler is equal to the sum of a distance L1 between the input facet and the bottom surface of the channel and a depth L2 of the channel, and a ratio L2/$L_t$ is in a range from about 0.1 to about 0.9.

8. The backlight unit according to claim 7, wherein $L_t$ is in a range from about 1 millimeter to about 20 millimeters.

9. The backlight unit according to claim 7, wherein $L_t$ is in a range from about 1 millimeter to about 10 millimeters.

10. The backlight unit according to claim 4, further comprising a base portion extending between the pair of taper portions.

11. The backlight unit according to claim 5, wherein a width Wx of the channel is in a range of 1 to 1.1 times Th1.

12. A display device comprising:
a display panel;
a backlight unit configured to illuminate the display panel, the backlight unit comprising:
a glass plate comprising a first major surface, a second major surface and a thickness Th1 therebetween; and
a light coupler bonded to the first major surface along an edge portion of the glass plate, the light coupler including a pair of taper portions bonded to the first and second major surfaces, respectively; and
a light source positioned adjacent an input facet of the light coupler, wherein a width Th2 of the input facet is in a range of 1 to 1.5 times a width Wd of the light source.

13. The display device according to claim 12, wherein the light coupler comprises a base portion adjacent an edge surface of the glass plate.

14. The display device according to claim 12, wherein Th1 divided by a width Th2 of the input facet is in a range from about 0.5 to 1.0.

15. The display device according to claim 12, wherein the light coupler includes a channel and the glass plate is positioned within the channel.

16. The display device according to claim 12, wherein the glass plate comprises an index of refraction $n_L$, the light coupler comprises an index of refraction $n_c$, and $n_c - n_L$ is in a range from about −0.4 to about 0.8.

17. The display device according to claim 12, wherein the light coupler further comprises a base portion extending between the pair of taper portions.

18. The display device according to claim 15, wherein a width Wx of the channel is in a range of 1 to 1.1 times Th1.

19. The display device according to claim 15, wherein the channel includes a bottom surface, and wherein a length $L_t$ of the light coupler is equal to the sum of a distance L1 between the input facet and the bottom surface of the channel and a depth L2 of the channel, and a ratio L2/$L_t$ is in a range from about 0.1 to about 0.9.

20. The display device according to claim 19, wherein $L_t$ is in a range from about 1 millimeter to about 20 millimeters.

21. A light guide plate configured for use in a liquid crystal display device comprising:
a glass plate including a first major surface, a second major surface opposite the first major surface, and a thickness Th1 therebetween;
a light coupler including a pair of taper portions bonded to the first and second major surfaces, respectively, the pair of taper portions forming a channel in which the glass plate is positioned, the channel including a bottom surface, and wherein a length $L_t$ of the light coupler is equal to the sum of a distance L1 between an input facet of the light coupler and the bottom surface of the channel and a depth L2 of the channel and a ratio L2/$L_t$ is in a ran we from about 0.1 to about 0.9.

22. The light guide plate according to claim 21, wherein the glass plate comprises an index of refraction $n_L$, the light coupler comprises an index of refraction $n_c$, and $n_c-n_L$ is in a range from about −0.4 to about 0.8.

23. The light guide plate according to claim 21, further comprising a base portion extending between the pair of taper portions.

24. The light guide plate according to claim 21, wherein a width Wx of the channel is in a range of 1 to 1.1 times Th1.

\* \* \* \* \*

UNITED STATES PATENT AND TRADEMARK OFFICE
CERTIFICATE OF CORRECTION

PATENT NO. : 10,018,765 B2
APPLICATION NO. : 15/310274
DATED : July 10, 2018
INVENTOR(S) : Thierry Luc Alain Dannoux et al.

Page 1 of 1

It is certified that error appears in the above-identified patent and that said Letters Patent is hereby corrected as shown below:

In the Claims

Column 12, Line 65, Claim 21, delete "ran we" and insert -- range --, therefor.

Signed and Sealed this
Twenty-fourth Day of December, 2019

Andrei Iancu
*Director of the United States Patent and Trademark Office*